United States Patent [19]

Kinghorn

[11] 4,295,296
[45] Oct. 20, 1981

[54] VERTICAL GARDEN

[76] Inventor: Michael H. Kinghorn, 178 Bible St., Cos Cob, Conn. 06807

[21] Appl. No.: 111,863

[22] Filed: Jan. 14, 1980

[51] Int. Cl.³ .............................................. A01G 25/00
[52] U.S. Cl. ....................................................... 47/82
[58] Field of Search ...................... 47/15, 14, 16, 48.5, 47/39, 66, 59–65, 67, 79, 82, 83, 32, 68

[56] References Cited

U.S. PATENT DOCUMENTS

| | | | |
|---|---|---|---|
| 875,235 | 12/1907 | Bastel | 47/82 |
| 1,084,414 | 1/1914 | Eger | 47/68 |
| 1,743,987 | 1/1930 | Tinaglia | 47/39 |
| 2,051,094 | 8/1936 | Loughridge | 47/61 |
| 3,458,951 | 8/1969 | Martin | 47/60 |
| 3,841,023 | 10/1974 | Carlyon | 47/82 X |
| 4,056,897 | 11/1977 | Pearce et al. | 47/39 |

FOREIGN PATENT DOCUMENTS

| | | | |
|---|---|---|---|
| 150460 | 3/1937 | Austria | 47/66 |
| 2648974 | 5/1978 | Fed. Rep. of Germany | 47/59 |
| 62922 | 5/1864 | France | 47/83 |
| 4781 | of 1905 | United Kingdom | 47/83 |

Primary Examiner—James R. Feyrer
Attorney, Agent, or Firm—Alfred E. Miller

[57] ABSTRACT

A garden assembly has a frame for separate removably supporting a plurality of open top troughs, one above the other. A separate horizontal distribution conduit is positioned above each trough, and a container adapted to be filled with water is disposed above the row of troughs. A separate tube connects the bottom of the trough removably to each of the conduits, so that the container is directly drained into each trough. The troughs have drain apertures in their bottoms positioned to drain each trough away from their respective lower troughs.

14 Claims, 8 Drawing Figures

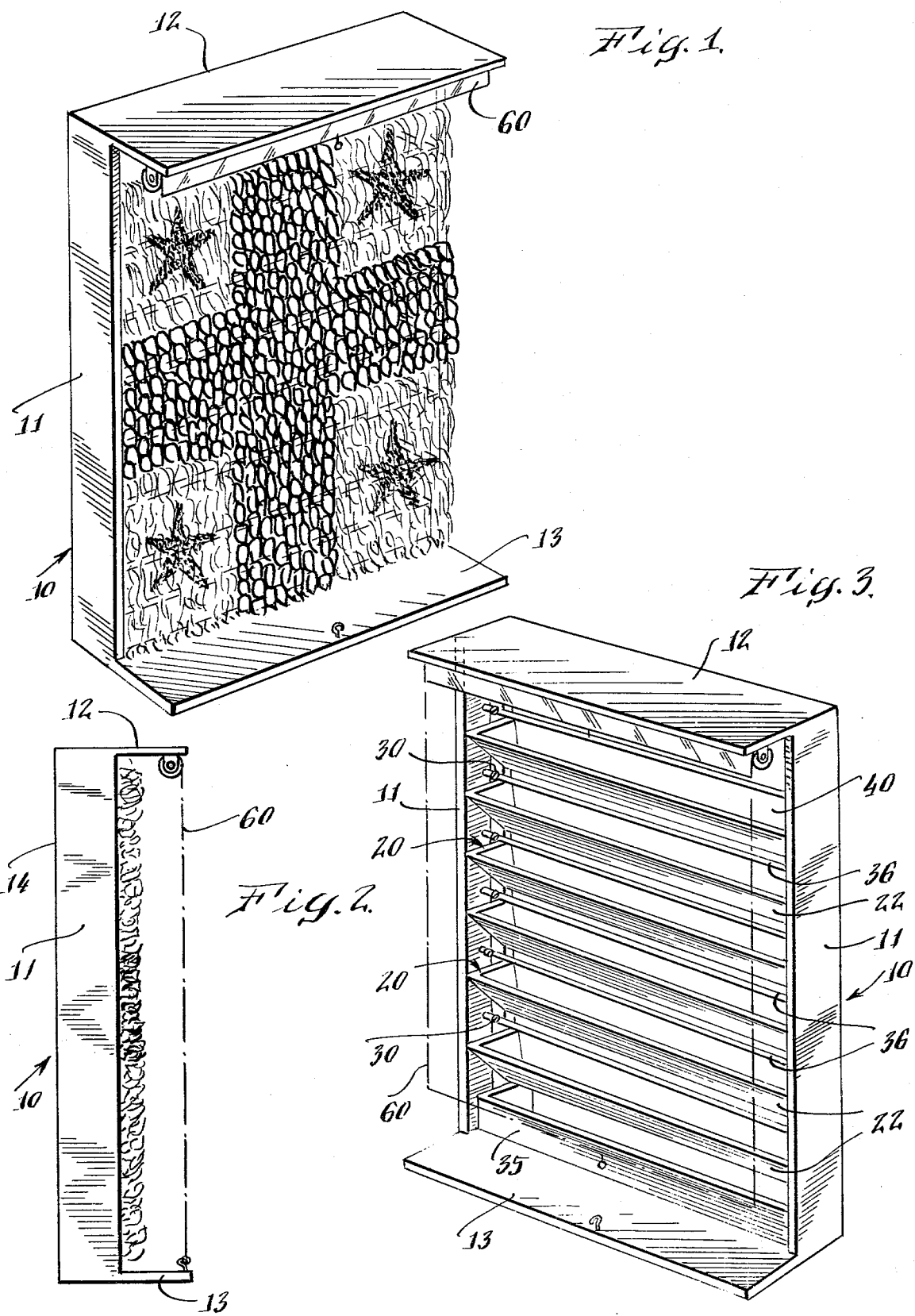

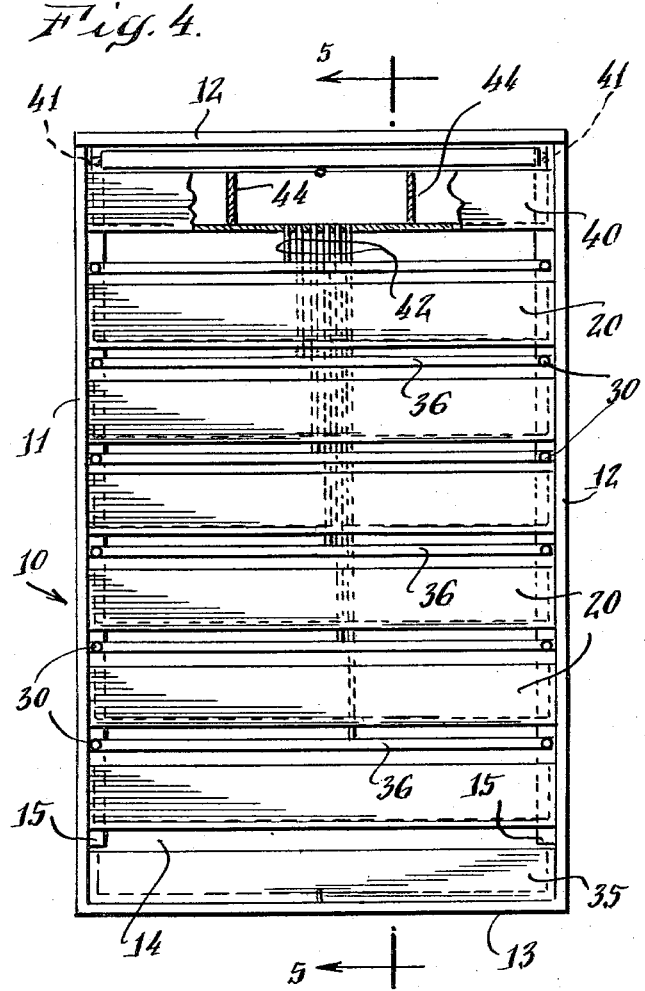
Fig. 4.
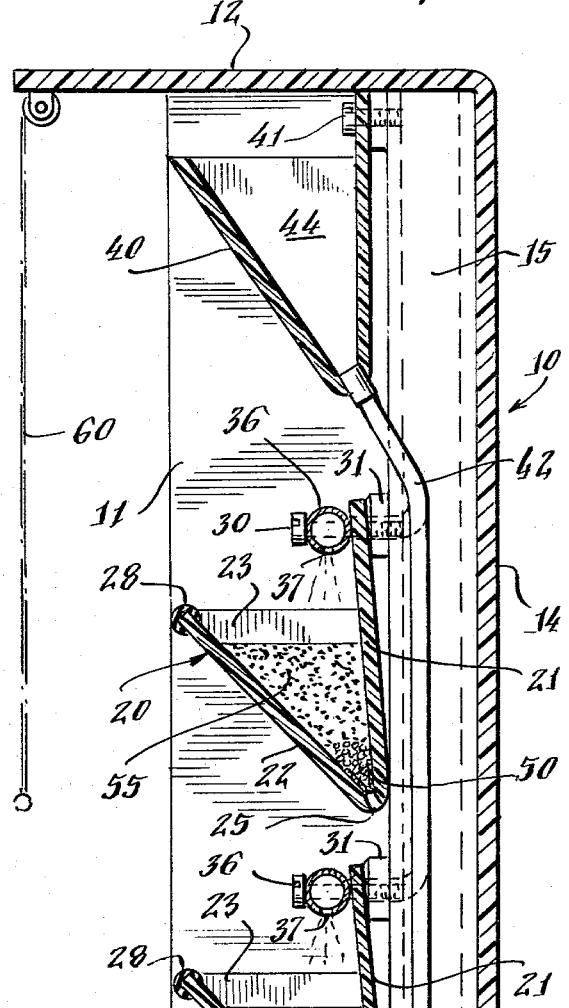
Fig. 5.
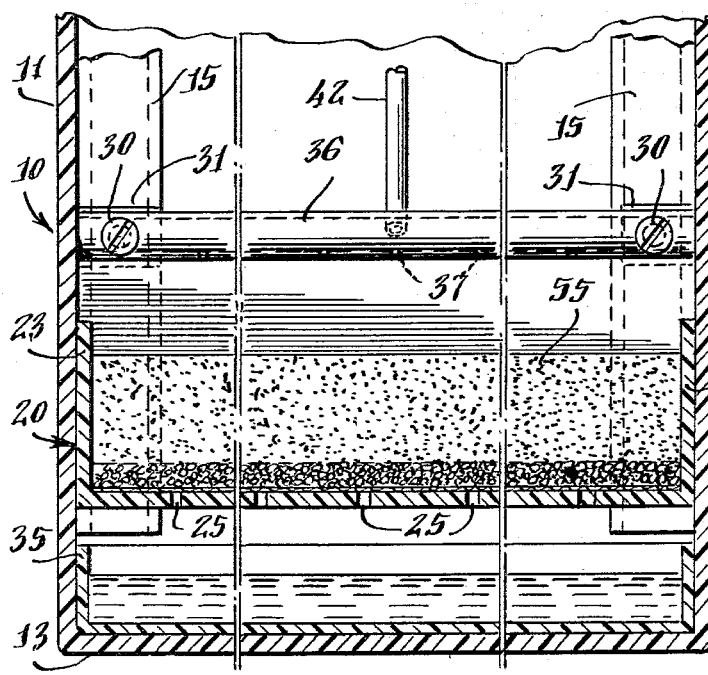
Fig. 6.
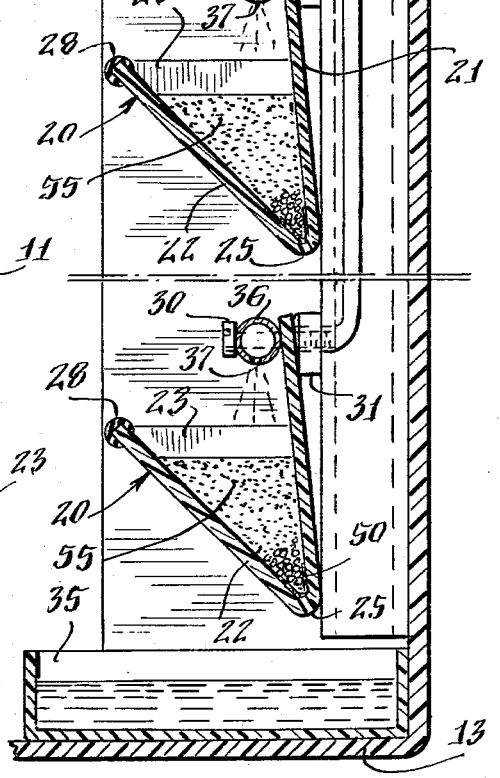

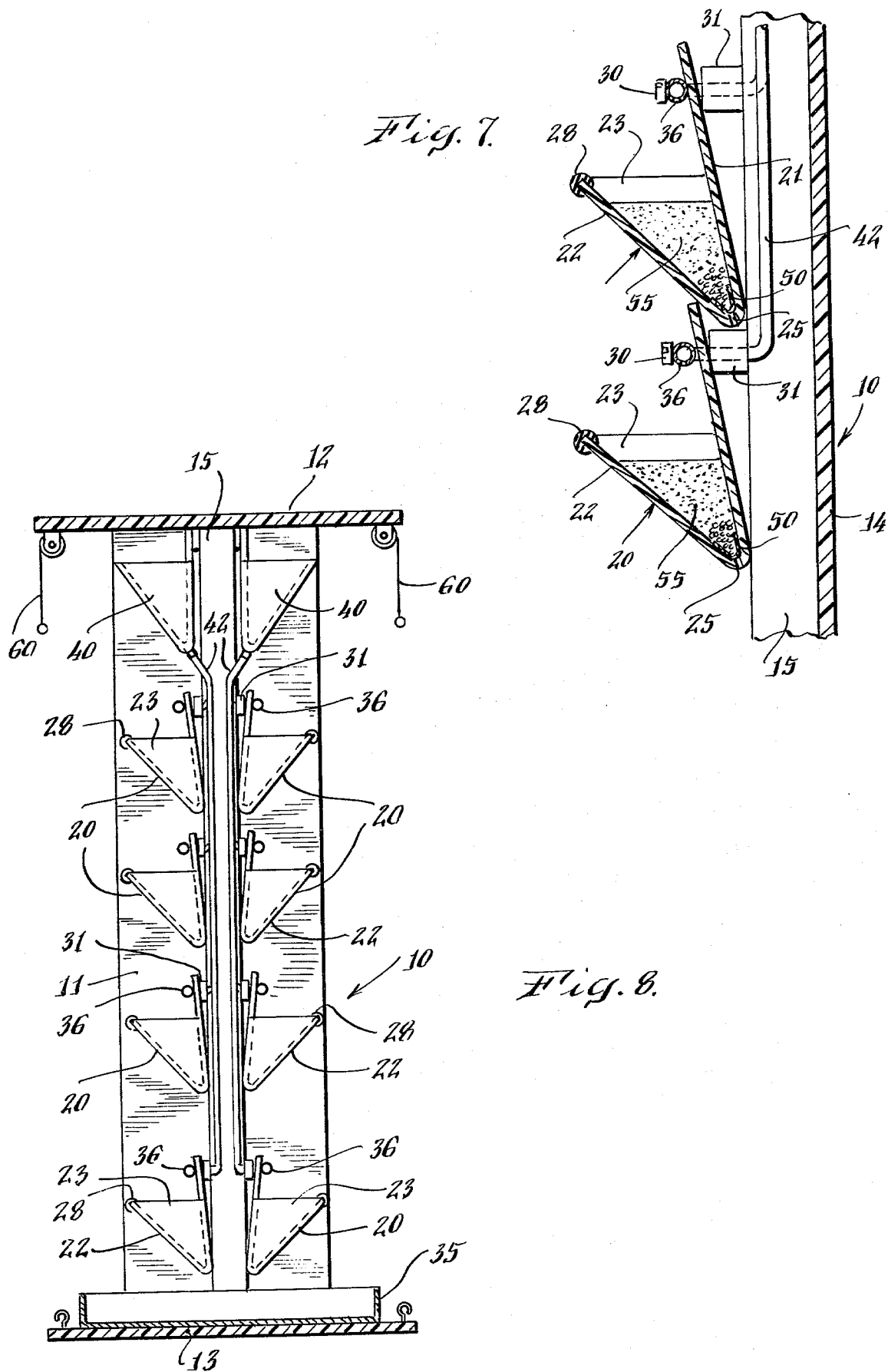

VERTICAL GARDEN

This invention relates to structures for growing plants, and more particular to a vertical garden, i.e., in which a plurality of plants may be arranged in a generally vertical orientation.

It is, on occasion, desirable to be able to arrange plants vertically, for a number of purposes. Thus, a vertical orientation may be provided for effectively displaying a number of plants, whereby a variety of plants of different colored foliage or inflorescence may be arranged in a desired pattern to provide a pleasing or striking display. On other occasions it is desirable to arrange plants vertically for growing purposes, for example, to minimize floor space, to take the greatest advantage of existing light, or to simplify care or irrigation of the plants.

While structures have been provided in the past for arranging plants vertically, they have in general had one or more disadvantages, such as difficulty in soil stabilization, in proper irrigation facilities or other difficulties in the proper care of the various plants.

The present invention is therefore directed to an improved vertical garden, overcoming the above problems of known structures, and comprising generally a plurality of horizontal troughs of substantially V-shaped cross-section with preferably closed ends. A frame is provided for supporting the troughs, preferably at their ends, so that the troughs are generally vertically aligned. The bottom of each trough is mounted so that the apex of the V-shape is directed rearwardly of the adjacent lower trough, so that apertures in the apices of the troughs are arranged to drain rearwardly of the next succeeding lower trough. The troughs are preferably arranged to be readily removable, for example, for planting purposes, in order to simplify the arranging of a vertical garden.

In order to irrigate the troughs, an accessible open top irrigation chamber is provided adjacent the top of the structure in the supporting frame, and a plurality of irrigating tubes extended downwardly from the chamber to horizontal distribution tubes separately arranged above each of the troughs. The horizontal distribution tubes have downwardly extending apertures in order to distribute water throughout the lengths of the various troughs. It must be pointed out that the irrigation system is preferably designed to rapidly distribute the water throughout the troughs from the irrigation chamber, such that the irrigation chamber will contain water only immediately following a periodic watering, the chamber thereby not functioning as a reservoir.

In a preferred embodiment of the invention, the frame for supporting the troughs as a continuous rear panel, so that the irrigation tubes extend in the space between the rear panel and the troughs. This arrangement, in combination with a transparent shade that can be lowered in front of the frame, enables optimum growing conditions for the plants.

In further variations of the structure, the vertical garden may be "two-sided", with two horizontally spaced apart vertical rows of troughs. In this arrangement, the irrigation tubes of course extend downwardly between the two rows.

In order that the invention will be more clearly understood, it will now be disclosed in greater detail with reference to the accompanying drawings, wherein:

FIG. 1 is a perspective view of the front of a vertical garden in accordance with one embodiment of the invention;

FIG. 2 is a side view of the garden of FIG. 1;

FIG. 3 is a perspective view of the vertical garden of FIG. 1, without the plants therein;

FIG. 4 is a front partially cross-sectional view of the vertical garden of FIG. 3;

FIG. 5 is an enlarged cross-sectional view of the vertical garden of FIG. 4, taken along the section lines 5—5;

FIG. 6 is an enlarged cross-sectional view of a portion of the vertical garden in a vertical plane normal to that depicted in FIG. 5;

FIG. 7 is a cross-sectional view of a portion of a modification of the vertical garden of the invention; and FIG. 8 is a simplified cross-sectional view of a further modification of the vertical garden of the invention, showing a double sided structure.

Referring now to the drawings, and more in particular to FIGS. 1–6, the preferred embodiment of the vertical garden is comprised of a generally rectangular vertical frame 10, preferably of a clear plastic material such as sheet Plexiglas, Lucite or the like. The frame thus has a pair of vertical sides 11, a horizontal top 12, and a horizontal bottom 13, formed as a rectangular box. The frame also has a back 14, which, in the preferred embodiment of the invention for a single row garden, is preferably continuous.

It is also preferred that the top and bottom of the frame be formed of wider pieces than the sides, so that, as illustrated, these pieces extend forwardly of the frame for a purpose that will be disclosed in greater detail in the following paragraphs.

The structure of the frame further includes vertical separating bars 15 for supporting the troughs. For example, the separating bars 15 may be in the form of a pair of vertically extending bars affixed to the rear panel 14, one of such vertical bars being located adjacent each side of the structure within their frame. These bars serve the function of enabling support of the troughs at each end thereof, while spacing the troughs in front of the rear panel to enable the irrigation tubes to extend between the troughs and the rear panel. It will of course be apparent that other structural features may alternatively be provided for supporting the troughs, while enabling the provision of spacing for the irrigation tubes.

As shown most clearly in FIGS. 3–6, a plurality of troughs 20 are provided, and, as shown in the cross-section of FIG. 5, these troughs have V-shaped cross-sections with rear walls 21, front walls 22, and end walls 23. The downwardly directed apices of the troughs, between the front and back sides thereof, are provided with a plurality of spaced apart drain holes 25, which may, as an example, be spaced apart by about by about 2 inches and be of ⅛ inch diameter. The troughs may be formed, for example, of 1/16 inch Plexiglas or other plastic material, for a 3 foot length thereof, and are also preferably transparent. For this width of structure, having a height of about 4 feet, it has been found that the frame 10 may have a thickness of about 1/10 of an inch, while the spacing bars 15 may space the troughs about ¾ of an inch from the rear panel 14 of the structure.

As is apparent in FIG. 5, the rear portions 21 of the troughs may be slightly higher, for example, ¾ of an inch, as compared with the front surfaces 22 thereof. The rear surfaces 21 may be, for example, about 5 inches high, and be at an angle of about 45° to the front pieces 22. Since plastic materials of this type frequently have sharp edges, rounded edges may be provided on the exposed upper front pieces of the troughs, for example by providing "boots" 28 of rubber or the like.

The troughs are positioned, one above the other, as shown in FIG. 5, and preferably held in place by means of noncorrodible screws 30, such as plastic, the screws extending into threaded holes in the separating bars 15. Spacing washers 31 hold the upper edges of the troughs spaced from the bars 15, so that the bottom edges of the troughs tilt backwardly, thereby to align the drain holes of each trough rearwardly of the top of the next lower trough. This feature inhibits water from any trough from entering any of the lower troughs, water drained off the troughs thereby dropping behind all of the remainder of the lower troughs into a tray or receptacle 35 removably positioned in the bottom of the frame on the bottom plate 13. The screws 30 may extend horizontally through the ends of the horizontal distributor tubes 36 for each tray. The distributor tubes 36 have closed ends, and a plurality of axially spaced apart holes 37 in their lower surfaces. The holes may be spaced apart, for example, 2 inches, and may have diameters of 1/16 of an inch. The distribution tubes 35 are also preferably made of a plastic material such as Plexiglas or the like.

A further trough 40, similar in cross-section to the lower troughs 20, is provided mounted in the top of the frame. This trough may be mounted in a similar manner to the lower troughs, although it is not provided with a distribution tube, and it is not necessary that the trough 40 be tilted, although it may be if desired. The trough 40 may have its closed ends closer together than the lower troughs, as shown in FIG. 4, in order to hold a determined quantity of water, such as, for example, two quarts, depending upon the size of the vertical garden. The trough 40 thereby serves as a chamber into which water is poured periodically, for irrigating the garden. As noted above, the trough 40 does not serve as a reservoir. This trough may also be of a transparent plastic material, and be mounted by means of plastic screws 41 threaded into the bars 15. A plurality of irrigation tubes 42, for example of transparent plastic material of ⅜ of an inch inside diameter, extend downwardly from the apex formed between the front and back of the trough 40, the tubes extending separately to the different horizontal distributor tubes 36. For this purpose, it is preferred that the tubes 42 have right angle turns or elbows at the respective lower ends thereof, whereby the ends of the tubes 42 extend horizontally into the rear walls of the distribution tubes 36. This interconnection is not fixed, so that the distributor tubes may be readily separated from their respective irrigation tubes 42, for example, when the troughs are removed from the frame for replanting, arranging or the like. It is noted that the horizontal interconnection between the tubes enables the distributor tubes to be separated by a straight horizontal separation movement that does not interfere with the mounting of the troughs, whereas other angular orientations of the connection have been found to introduce an undesirable twisting of the distribution tubes to render the mounting of the troughs and distribution tubes in the frame more difficult. In one example of a trough 40 in accordance with the invention, the trough, between its end walls 44, was about 10 inches. The irrigation tubes 42 extend downwardly to the rear of the troughs, in the space formed by the spacers 15, so that they do not interfere with the troughs or the mounting of the troughs in position. While examples of the sizes of the various apertures and tubes has been given, in order to emphasize the fact that the trough 40 is not a reservoir, in one example of the invention for watering about 200 plants in a structure about 4 feet high and 30 inches wide, the water for each watering session completely drained out of the trough 40 and into the troughs 20 in about 2 seconds.

As is further evident in FIG. 5, a filter 50 is provided in the bottom of each trough covering the drain holes 25 therein. This filter may, for example, be in the form of a Nylon gauze having a 1/16 inch or 1/32 inch mesh. The troughs themselves are preferably filled with a soilless medium, for example of sand and peat with major and minor trace elements added, in accordance with conventional planting practice. This medium is shown at reference numeral 55 as substantially filling the planting troughs. In addition, ground up polyfoam or the like may be provided in the bottom of each of the troughs, to further enhance the growing environment in the vertical garden by serving as thermal insulation.

As above discussed, the top and bottom of the frame extend forwardly of the side edges thereof. This enables a clear plastic sheet 60, for example known as a conventional window shade, to be mounted on the underside of the forward extension of the upper member 12 of the frame. The sheet or screen 60 thereby serves as a humidity screen, and can be drawn downwardly to the proximity of the forward extension on the bottom of the frame at night, in order to maintain the vertical garden structure. It is, of course, preferable that the receptacle 35 extends forward sufficiently that moisture formed on the screen or sheet 60 can drip into the receptacle. The screen or sheet 60 is preferably spaced about 1 to 3 inches in front of the leaves or foiliage of plants in the garden, in order to enable air movement therebetween.

While it is preferred a material such as Plexiglas or the like be employed in the fabrication of the garden, it is of course apparent that other materials could be employed for the frame and troughs, such as redwood.

The vertical garden in accordance with the invention is adaptable for indoor, outdoor or greenhouse environments. In greenhouses, for example, it may be employed for plant propagation, and enables an improvement, for example, four times in the energy expenditure due to the vertical alignment of the plants. It may also be employed for propagation purposes in other embodiments.

When employed as a display device, it is of course preferred to employ plants of different colors to form a desired display. For example, In outdoor use achillea may be employed for dark green colors, ajuga may be employed for dark red coloration, veronica may be employed for light green, silene may be employed for grayish white, festuca may be employed for blue tinged white colors, and sedum may be employed for its blue green color.

When employed indoors, small house plants such as African violets, dracena godseffina, eschyianthus, columbnia, various ivy plants, and hens and chicks may be employed to form the display. Thus, if it is desired to display sharply defined stars, or similarly sharply defined objects, one may wish to employ a number of hens and chicks.

In the further embodiment of the invention illustrated in FIG. 7, the troughs or trays may be more closely spaced, by lowering the mounting screws for the troughs. This provides a degree of clearance between the top of the troughs and the spacer bars, so that the apex of the next above trough can be slipped slightly behind the top of the trough below it. As a result, the mounting of the troughs may be simplified to a certain degree since they are permitted to pivot slightly on the top of the lower trough. In addition, this arrangement insures that any water drained from a trough will go behind the next lower trough, and not drain into such lower trough.

While reference has been made to the receptacle 35, it must be pointed out that most of the water will be retained in the growing medium in the trays, so that it will not be necessary to frequently empty this receptacle. Further, the receptacle 35 aids in maintaining the desired humidity level for the plants.

In the further embodiment of the invention illustrated in FIG. 8, two vertical spaced apart rows of troughs are provided in the frame, with the irrigation tubes extending in the space between the two rows of trays. In this arrangement, the frame is not provided with a back cover since it has a plastic screen or sheet that may be rolled down on the side facing each of the rows. It is thus pointed out that the back of the vertical garden, the arrangement shown in FIGS. 1-6, serves the further function of insuring the proper humidity level and avoiding drafts on the plants.

While the above paragraphs show one technique for mounting the individual troughs or trays, it will be apparent that other techniques may be employed. For example, the mounting may be simplified by employing simple hooks extending from the frame members. In this case, if desired, the horizontal distribution tubes may also be affixed to the respective troughs, by any conventional technique.

It will of course be apparent that the fineness in detail of a design is dependent, to a certain extent, upon the size and spacing of the trays, and that for this purpose, the optimum height of the trays will be from about 4 to 6 inches.

The vertical garden in accordance with the invention is preferably mounted with its bottom on a firm foundation. Since the single row variety does not have great depth, for stability purposes should be mounted on a wall, being held in place by conventional brackets or hooks. In this arrangement, it is apparent that the solid back wall of the frame also prevents water from the garden from damaging the wall.

While the design provided is of course a matter of choice, and the use of different types of plants, one example of such a design is depicted in the vertical garden of the invention in FIG. 1, the differently appearing areas being formed by groups of plants of different kinds, so that in fact these differently appearing areas may be distinguished in an actual garden by different coloration or texture.

While the invention has been disclosed and described with reference to a limited number of embodiments, it will be apparent that variations and modifications may be made therein, and it is therefore intended in the following claims to cover each such variation and modification as falls within the true spirit and scope of the invention.

What is claimed is:

1. An upright garden assembly for culture of vertical garden displays comprising a plurality of elongated open top growing troughs, said troughs having front and rear sides and drain apertures, support frame means for separately removably supporting said troughs horizontally one above the other to form a substantially vertically extending row of trays with the drain apertures of each trough positioned and directed toward said rear side to cause drainage to be directed to the rear of the rear sides of the troughs thereunder, a water container mounted above said row, a separate horizontal distribution conduit mounted above each trough and having irrigation aperture means for directing water to the respective trough, and plural separate tubes extending substantially directly downwardly from the lower portion of said water container, each tube being releasably terminated in a respective distribution conduit in a removable connection.

2. The assembly of claim 1 wherein said tubes are positioned adjacent the rear sides of said troughs.

3. The assembly of claim 1 wherein said support means has a rear wall spaced from said troughs, said tubes extending downwardly in the space defined between said rear wall and said troughs, and communicating said container to the respective said conduits.

4. The assembly of claim 1 wherein said tubes have sufficiently large diameter and said aperture means are sufficiently large that water poured into said container is drained into said troughs in about two seconds after filling of said container.

5. The assembly of claim 1 wherein said troughs have V-shaped cross-sections defined by front walls and rear walls and closed ends, the drain apertures for said troughs being located at the apices of the V-shaped cross-sections, the apex of each trough being located rearwardly of the top of the rear wall and forwardly of the bottom of the rear wall of the trough immediately thereunder.

6. The assembly of claim 5 wherein said support means comprises a generally rectangular frame having vertically extending sides and a vertically extending rear wall, spacing means on said rear wall, and screw means extending horizontally through said conduits and the rear walls of said troughs, in that order, and thence into said spacing means, for holding said troughs and conduits.

7. The assembly of claim 6 wherein said screws are displaced beneath the tops of the rear walls of the respective troughs, and the apices of said troughs extend behind the upper edge of the rear wall of the respective next lower trough.

8. The assembly of claim 1 further comprising a humidity screen mounted to be removably held in front of said row.

9. The assembly of claim 1 wherein said support means comprises a transparent rigid plastic frame having a complete rear wall spaced from said troughs.

10. The assembly of claim 1 wherein said tubes have elbows at their lower ends, said elbows extending horizontally removably into the rear of the respective conduit.

11. The assembly of claim 1 further comprising gauze covering said drain apertures of said troughs.

12. The assembly of claim 1 wherein said conduits have irrigation apertures of about 1/16 inch diameter spaced therealong, and said tubes have inner diameters of about ⅜ of an inch.

13. The assembly of claim 1 further comprising a drain tray removably positioned at the bottom of said support means for receiving water drained from said drain apertures.

14. The assembly of claim 1 further comprising a second plurality of elongated opened top growing troughs having drain apertures and removably supported in said support means to form a second substantially vertically extending row of troughs horizontally one above the other, said second row being horizontally spaced from said first row and arranged with the drain apertures of the troughs of each row being directed into the space between the rows, an apertured horizontal distribution conduit for each of the troughs of said second row, a further separate tube extending downwardly from said container to removably terminate in the distribution conduits of said second row, said first-mentioned and second tubes extending in the space between said rows.

* * * * *